Aug. 2, 1966    L. PETERS    3,263,840

METHOD OF DISPENSING EMBOSSED BUTTER PATTIES

Filed March 20, 1963    3 Sheets-Sheet 1

FIG. 1

FILL BOTTOM OF COOLER WITH:
CRUSHED ICE   ICE CUBES & WATER

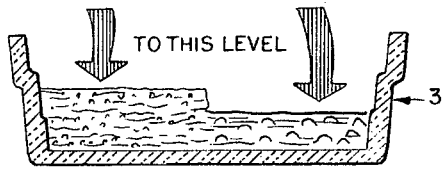

NOW (THIS IS IMPORTANT): ADD ½ CUP
OF SALT TO ICE AND MIX THOROUGHLY

THIS BRINGS TEMPERATURE OF ICE
DOWN TO 20° FOR ABOUT 8 HOURS

FIG. 2

FILL PAN WITH ICE-COLD WATER
TO LEVEL OF KNOBS.

AND PLACE PAN INSIDE COOLER
WHERE IT MUST ALWAYS BE IN
DIRECT CONTACT WITH ICE

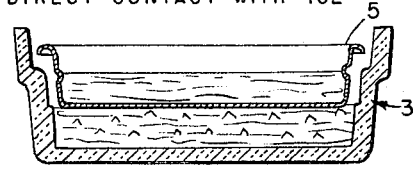

FIG. 3

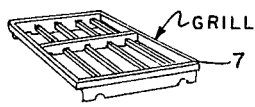

PLACE GRILL INSIDE PAN

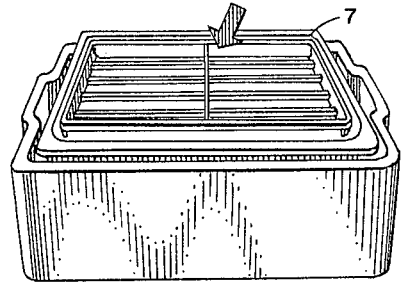

FIG. 4

LAY PATTIES ON GRILL

HAVE MOLDED SIDE UP SO GROOVES
AROUND OUTER EDGES OF PLASTIC
SHEET FIT OUTER EDGES OF GRILL
LIKE THIS

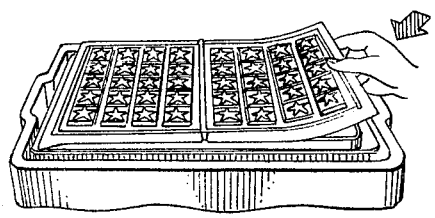

FIG. 5

RETAINER RING

FASTEN RETAINER-RING
AROUND PLASTIC SHEET
LIKE THIS

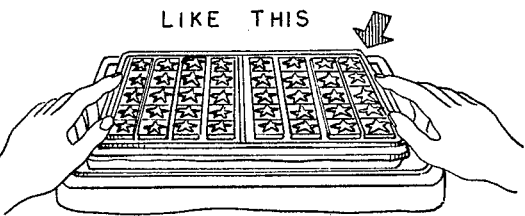

FIG. 6

PUSH OUT PATTIES

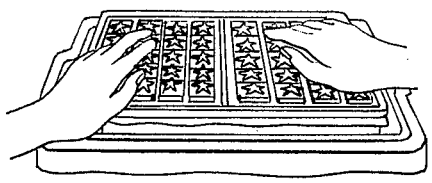

PUSH OUT ALL THE PATTIES, THEN
REMOVE GRILL WITH PLASTIC SHEET.

PATTIES REMAIN FLOATING ON
COLD WATER READY TO LIFT
OUT WITH A FORK.

INVENTOR:
LEO PETERS
BY
Dawson, Tilton, Fallon, Lungmus & Alexander
ATT'YS

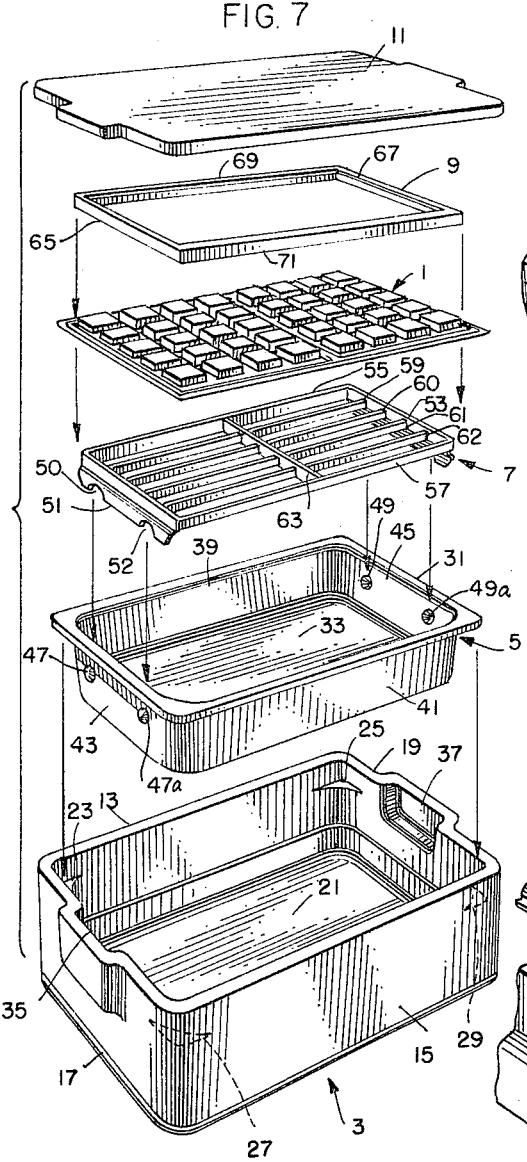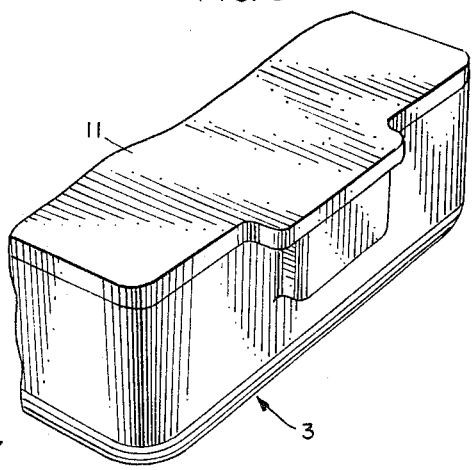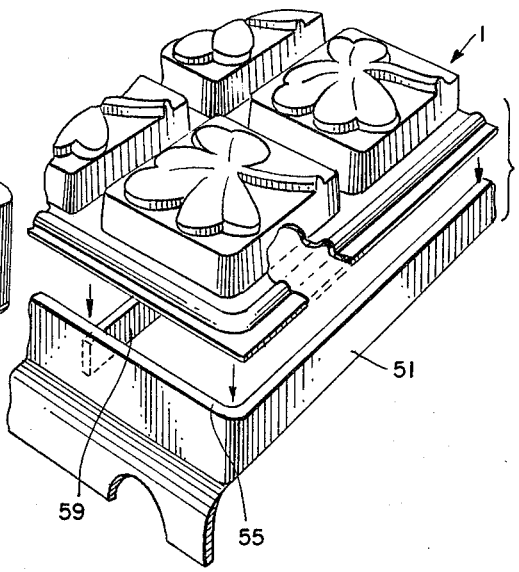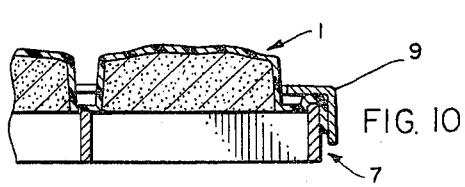

Aug. 2, 1966　　　　　　L. PETERS　　　　　　3,263,840
METHOD OF DISPENSING EMBOSSED BUTTER PATTIES
Filed March 20, 1963　　　　　　　　　　　3 Sheets-Sheet 3
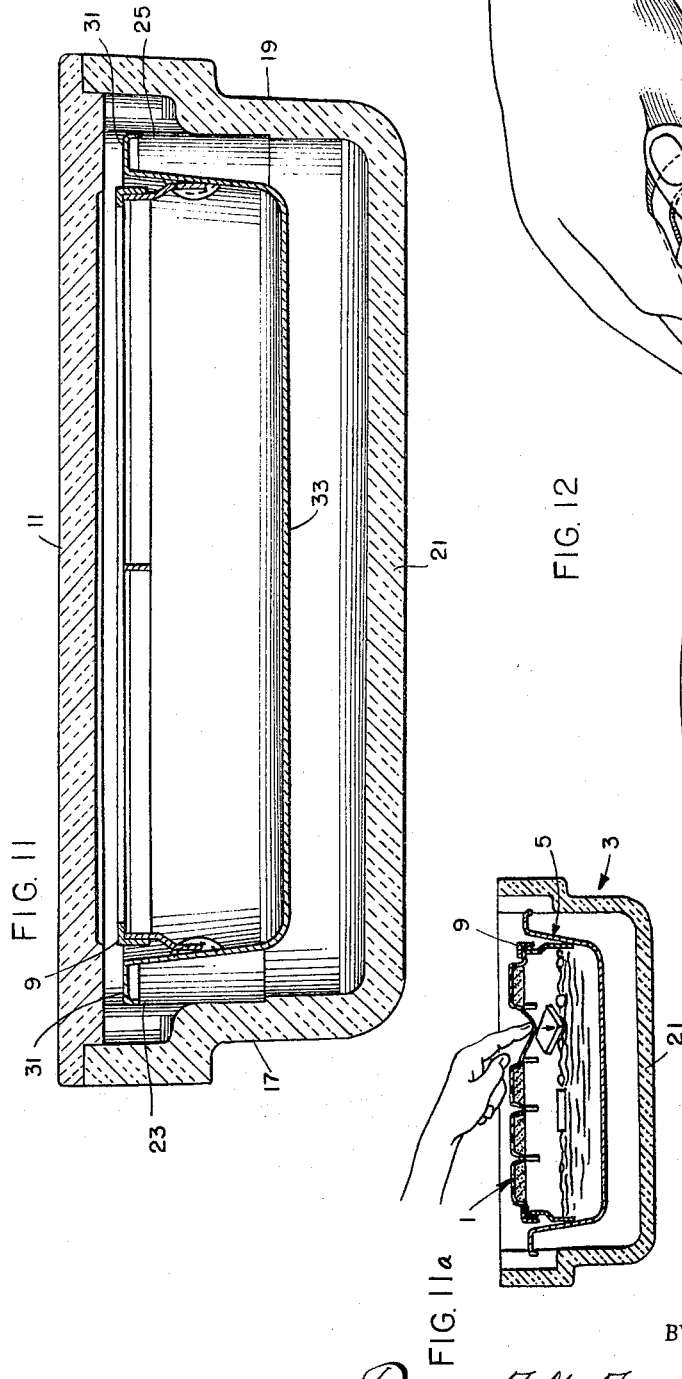
INVENTOR:
LEO PETERS
BY
Dawson, Tilton, Fallon, Lungmus & Alexander
ATT'YS

United States Patent Office 3,263,840
Patented August 2, 1966

3,263,840
METHOD OF DISPENSING EMBOSSED BUTTER PATTIES
Leo Peters, 750 Plymouth Road SE., Grand Rapids, Mich.
Filed Mar. 20, 1963, Ser. No. 266,591
2 Claims. (Cl. 214—152)

This invention relates to a method and means for dispensing, storing and serving food patties, and while useful in relation to other packaging techniques, is especially adapted for use in connection with the multiple mold sheets described in my copending applications Serial Nos. 185,901 now abandoned and 213,753, now Patent No. 3,183,107, especially when the teachings of those applications are applied specifically to molded food patties.

In describing the advantages and objects of the present invention, and indeed, in relating this invention to my prior applications, it is believed necessary to first refer to the drawings. In the drawings:

FIGS. 1–6 are illustrative of the steps involved in preparing the cooling and serving device and the removal of patties from a multiple mold sheet in accordance with the teachings of this invention;

FIG. 7 is a perspective view of a particular embodiment of the cooler and serving unit complete with the dispensing apparatus, exploded to show the component parts;

FIG. 8 is a partial perspective view of the cooling and service device assembled with the cover on;

FIG. 9 is a partial view in perspective showing the precise manner in which the multiple mold food patty sheet is placed upon the dispensing grill for removal of the patties;

FIG. 10 is a cross-sectional view showing the relationship of the multiple mold food patty sheet in place upon the dispensing grill and secured thereto by the retaining ring prior to removal of the food patties;

FIG. 11 is a cross-sectional view of the cooling and service device; and

FIG. 11a is a cross-sectional view of the dispensing grill, serving unit, and cooling tank demonstrating a patty falling into the water in the serving unit.

FIG. 12 is a perspective view of a food patty being served.

The multiple mold food sheet previously described in my copending application Serial No. 185,901 is again demonstrated in FIGS. 5, 6, 7, 9, and 10 of this application. It is believed that the greatest use of this invention will be in connection with what are commonly called "butter patties," although it is to be recognized that the use of this invention, and also those taught in my copending applications, are broader in application.

While the multiple mold film sheet provides a most effective means of readily molding butter patties, packaging them for shipment and storage, and permits facile dispensation, it is recognized that the dispensation of such patties from such a multiple mold film sheet in commercial establishments such as restaurants is subject to rather critical demands.

As previously described in my copending applications, the utilization of a multiple mold film sheet for butter patties presents commercial establishments with numerous advantages over prior methods of butter-patty handling. Namely, it permits the use of patties which are embossed with attractive, detailed designs; it permits a very facile manner of handling large numbers of patties without distortion or breakage; and, it permits dispensation of butter patties without being touched by human hands. Thus the multiple mold film sheet is considerably superior to prior methods of butter-patty handling, from the steps of initially forming and packaging the butter patties to actual delivery at commercial establishments for use. Also, the multiple mold film sheet provided certain inherent advantages over prior methods of butter-patty handling from the time of arrival at the commercial establishment until the service to customers by eliminating all touching by human hands, facile dispensation, more decorative appearance, and the like. Therefore, one of the objects of the present invention is to further facilitate the use of multiple mold film sheets to expedite and appreciably improve butter-patty handling from time of arrival at the commercial establishment to service to the customer.

A brief discussion of prior methods of butter handling from the time of arrival at the commercial institution to customer service will be helpful. Prior methods of butter handling involved invariably the transfer of the butter patty cartons or packages into a refrigerator.

From this point on, the prior methods divided into two distinct groups. The first method involved opening the packages and removing the patties one by one. The second method involved removal of the butter patties from the containers or packages and surrounding them in bowls or pans of crushed ice. The first method is obviously unsatisfactory in that the waitress is seriously inconvenienced in having to separate the butter from a package within the refrigerator where light is poor, and also by the fact that the refrigerator may not be centrally located.

The second method of butter removal is more advantageous than the first in that the bowl or pan of crushed ice containing the butter patties may be placed in a more convenient location having adequate light. However, the advantages of this method stop at this point. This second method necessitated the individual removal of patties from the packages one by one and delicately placing them within the crushed ice. Thus, two shape destroying steps had to be taken before the final step or removing the patty from the crushed ice for service upon the plate of the customer. In view of the delicacy of the butter patties, and especially delicately embossed patties, this extra step resulted in extensive breakage and disfigurement of patties, rendering them unservable. Further, crushed ice tends to adhere to the patties, thus constantly reducing the amount of refrigerant present, and further, when the ice melts on the serving plate, it leaves a distasteful and wet surface upon which to place bread, rolls, and the like. The sogginess produced in bread and rolls thereby was enough to discourage the use of this method.

Further, since crushed ice melts extremely rapidly, it is frequently necessary to replenish the bowl with additional ice almost hourly and rearrange the patties therein.

One of the problems common to both of the prior methods of handling butter patties is in relationship to their being separated from their aggregated groupings to accommodate individual service. Since butter patties tend to stick together, any contact between patties, especially during a warming exposure or when even a slight pressure is exerted on or against the patties, increases the significant tendency of the patties to adhere. Thus, when a waitress is attempting to separate the patties for service, she must often struggle with the aggregated patties and in doing so, break a patty and render it unservable. Therefore, it is another object of this invention to provide a device and means for retaining butter patties prior to customer services which completely prevents the patties from sticking together in aggregated groupings.

When butter patties are formed and packaged in single, thin, flexible, multiple mold sheets, neither of the prior methods of serving patties to customers is particularly applicable. Indeed, the use of the multiple mold sheet adds to the problems aforementioned in adding a new step, namely, the step of removal of the butter patties from the individual mold cavities formed in the sheet. Further, the prior methods impose problems upon the use of the mold sheet which limits its effectiveness. Namely, the prior methods would necessitate the removal of the butter patties by placing the sheet on a hard surface, with the mold cavities initially disposed upwardly, the pressing down on the upper portion to reverse the mold cavities, thus forcing the individual butter patties outwardly upon a hard surface. Due to the delicacy of the patties, it is most desirable that they not be pressed upon a hard surface, which action would in some instances tend to crack the patty and, if a patty landed improperly on the hard surface, would serve to mar the delicate figures on the patty. Also, placing delicately formed patties in and on crushed ice would subject them to abrasive action which would be further damaging to the surfaces. Removal of the patties from the crushed ice by the traditional method of fork-jabbing or by attempting to lift them would force them against the hard abrasive surface of the crushed ice and further serve to mar the delicate features.

Therefore, one of the primary objects of this invention is to provide a new concept of serving butter patties which is particularly related to the specific problems posed by the use of multiple mold sheets. More particularly, it is a principal object of this invention to provide a method and means of removing food patties from multiple mold sheets which permits the patties to be removed individually or in large numbers and to be received immediately from the mold cavity in a cushioning body of cold water, thus serving to prevent breakage or marring of the patties while providing a cooling means for maintaining the shape of the patty until service.

Further objects of the present invention are to provide a method and means of rapidly dispensing large groupings (20, 40, 60, or more) butter patties with simple, quick movements, without being touched by human hands or instruments, into a cushioning receptacle and then held in ready-to-serve storage in a manner preventing aggregation of patties into adhering groups, and accessible for serving with a fork without jabbing, pushing, or in any way putting mis-shaping pressures on any portion of the patties.

First a description of one embodiment of the apparatus which I employ to accomplish the foregoing will serve as an introduction to a more particular description of the process which I recommend be used.

As best seen in FIG. 7, the cooling and service device is seen generally to be comprised of an insulating tank 3, a service pan 5, a dispensing grill 7, a retainer ring 9, and an insulated cover 11.

The insulating tank 3 is preferably made of an insulating plastic material such as polystyrene and which is molded so as to provide a pan or tank having two side walls 13 and 15 and two end walls 17 and 19, which may be formed integrally with the bottom 21. While plastic materials lend ideally to the molding of the insulating tank 3 into an integral unit, yet, for the purpose of this invention, the tank can be duplicated in numerous ways without departing from the spirit and scope of the invention. The essential elements of the insulating tank 3 are that it be watertight, and that it be sufficiently insulated to retain a quantity of ice for a long period of time without melting.

In the form of the invention shown in FIGS. 7 and 11, the insulating tank 3 is formed with retaining shoulders 23, 25, 27, and 29 formed in each corner and located adjacent the upper edge of the respective sides and ends, but spaced therefrom sufficiently to receive the flange 31 of the service pan 5 thereon, and yet provide sufficient room between the bottom 21 of the insulating tank and the bottom 33 of the service pan to accommodate a relatively large quantity of ice.

The end walls 17 and 19 of the insulating tank 3 are each preferably formed with an outwardly protruding pocket 35 and 37 which permits the fingers of the user to be inserted between the portions of the respective end walls defining the pockets 35 and 37 and the edges of the serving pan flange 31 to permit that flange to be grasped to lift the service pan from and onto the aforementioned retaining shoulders 23, 25, 27, and 29.

The service pan 5 is preferably formed of metal in order to permit the rapid transfer of the cooling effect so that when the bottom 33 of the service pan 5 is placed in contact with the ice and water in the insulating tank 3, the cooling effect will be rapidly conveyed to the contents of the service pan.

The service pan 5 is comprised of two rather shallow side walls 39 and 41, and two rather shallow end walls 43 and 45. A flange 31 surrounds the entire upper edge of the service pan 5 and extends outwardly sufficiently to be received on the retaining shoulders 23, 25, 27, and 29, yet while permitting receipt within the insulating tank 3. Adjacent the upper portion of each of the opposing end walls 43 and 45 are two spaced studs or knobs 47, 47a and 49, 49a which project inwardly for a short distance in order to provide a seat for the dispensing grill 7. The dispensing grill 7, in the particular embodiment shown (this embodiment of the grill-work can be varied considerably, without departing from the spirit of this invention, to accommodate numerous configurations of multiple mold design on the film sheet) is comprised of two end plates 51 and 53 which are connected by two spaced side runners 55 and 57. Evenly spaced between the side runners and extending between the respective end plates 51 and 53 are four spaced support bars 59, 60, 61, and 62, corresponding to the spaces between the aligned mold cavities formed in the multiple mold sheet. Intermediate the two end plates is a further support plate 63 connected to the side runners 55 and 57 to add additional rigidity and support to the multiple mold sheet 1.

The multiple mold sheet 1 is identical to that shown and described in my prior application Serial No. 185,901. It should be noted from FIGS. 7 and 9 that the mold sheet has end grooves 51a and 53a, side grooves 55a and 57a and midsection groove 63a corresponding with grill members 51, 53, 55, 57 and 63. These grooves provide a quick, sanitary, non-mechanical, positioning means for the mold sheet on the grill.

It is to be particularly noted that the respective end plates 51 and 53 of the dispensing grill 7 are curved outwardly and downwardly at the lower apron, and formed with spaced openings 50 and 52 which enable the dispensing grill to be received and supported upon the supporting studs 47, 47a, 49, and 49a located within the service pan 5.

The retainer ring 9 is formed with two end pieces 65 and 67 joined to two side pieces 69 and 71. The end pieces and the side pieces are respectively flanged inwardly to enable the retainer ring 9 to secure the edges of the mold sheet 1 to the periphery of the dispensing grill 7, as is best seen in FIG. 10.

The insulated cover 11 is preferably made in the same manner as the insulating tank 3 in order to provide insulation of the contents, and is formed to correspond with the plan view of the top of the insulated tank 3 in order to insure complete coverage and hence insulation, as is shown in FIG. 8.

In order to describe the recommended manner of using the apparatus previously described, reference will now be had progressively to FIGS. 1 through 6.

First, the insulating tank 3 is filled with crushed ice, or ice cubes and water to the approximate levels indicated in FIG. 1, said level being sufficient to assure contact between the bottom of the surface pan 5 and the water when the service pan is placed within the tank 3.

To the crushed ice, or ice cubes and water is added approximately one-half cup of salt per two gallons, the contents then being mixed thoroughly. The addition of the salt to the ice or ice and water mixture brings the temperature of the mixture down to at least 20 degrees, and because of the insulation provided by the insulating tank 3 and the insulated cover 11, this temperature can be maintained for about 8 hours under normal and usual working conditions.

The service pan 5 is then filled with cold water to the level of the studs and the pan placed inside the insulated tank or cooler 3 with the flange 31 of the service pan resting upon the retaining shoulders 23, 25, 27, and 29 formed within the insulating tank. In this position, the bottom of the service pan 5 is in contact with the water in the insulating tank, as shown in FIG. 3. It is also to be noted that in placing the service pan 5 into the insulating tank 3, the pockets 35 and 37 ideally permit the fingers on each hand to grasp opposing edges of the service pan flange for convenient insertion without spilling. An incident of the close relationship between the flange 31 and the cooler 3 is that even when the cover 11 is off, the ice and salt water mixture is not exposed directly to the warm air, thus the water-filled pan 5 also serves as an excellent barrier to loss of the refrigerant.

The dispensing grill 7 is then placed so that the respective end plates 51 and 53 and the notches formed therein sit upon the respective knobs or studs 47, 47a, 49, and 49a formed in the end walls of the service pan 5. It is important that the relationship of the dispensing grill 7 to the service pan 5 be a stable one because of the pressures to be applied, as described later herein.

The mold sheet 1 is then placed upon the dispensing grill 7 so that grooves 51a, 53a, 55a, 57a and 63a align with grill members 51, 53, 55, 57 and 63, as shown in FIG. 9. This alignment automatically places the mold cavities in position for ejecting the patties between support bars 59, 60, 61 and 62. The mold sheet is made sufficiently larger in area than the dispensing grill 7 so that a portion of the film sheet 1 extends outwardly beyond the side runners 55 and 57 and the end plates 51 and 53.

The retainer ring 9 is then placed over the outward extensions of the film sheet 1 and pushed downwardly over the dispensing grill 7 to form a very tight clamping fit, as demonstrated in FIG. 10. Indeed, the relationship of the retaining ring to the dispensing grill should be such as to insure that the clamping forces exerted by virtue of their juxtapositioning will firmly secure the entire film sheet to the grill to withstand the removal forces to be applied. This stretches the multiple mold sheet so that the surface from which the molds project becomes relatively rigid and inflexible.

Next, the hand of the user may be run over the top surface of the mold sheet 1, reversing the mold cavities in a single stroke, forcing the butter patties downwardly through the dispensing grill 7 and into the service pan 5 where the patties are received and cushioned in their fall by the water within the service pan 5.

It is particularly important to note that the film sheet 1 may be formed to provide patties with different types of ornamentation and, in certain instances, it may be desirable to remove only those patties having a certain ornamentation. Thus a patty at the center of the mold sheet may be removed alone without disturbing any other patty. The use of the apparatus previously described is compatible with removal of individual patties from the molds by the simple expedient of using one finger or two fingers to depress the mold having the butter patty with the ornamentation desired.

The dispensing grill 7 and retainer ring 9 may then be removed from the service pan 5 and the insulated cover 11 put in place over the insulating tank 3.

Then, when a waitress wishes to obtain a butter patty for service, she need only remove the cover with one hand, insert a fork in the water beneath the patty, lift upwardly to support the patty on the fork, and place the patty on a service plate. Indeed, because of the natural separation afforded by the water, the waitress will not need to separate or pry apart stuck-together patties for service, as she has had to do with prior methods.

Therefore, it is seen from the prior particular description that I have provided an improved method and means pertaining to the removal, storing and serving of food patties which, when related to butter patties particularly, utilizes one of the natural characteristics of butter; namely, its lower specific weight compared to water, to act both as a cushioning medium to receive the patties when they are removed from the multiple mold sheet, in order to prevent their being damaged, and which also results in the butter patties floating on the surface of the water to provide constant, thorough cooling of each patty while maintaining a separation of the patties to prevent their being aggregated into adhering groups, and which presents the patties for individual accessibility by permitting the removal instrument to penetrate the fluid and not the patty, and permits the patty to be served to the customer without undue exposure to the pressures, abrasive action, and excessive handling inherent in prior methods.

It is further seen from the foregoing description that I have provided a method and means to further facilitate the use of multiple mold film sheets to expedite and appreciably improve butter patty handling from time of arrival at the commercial establishment to service to the customer; and which permits the simultaneous or individual removal of a large number of butter patties from multiple mold sheets in a manner preventing breakage or marring while simultaneously providing for maintaining the patties at a shape-preserving temperature for a long time.

I claim:

1. A method of dispensing embossed butter patties from a unitary, thin, flexible, multiple mold sheet having formed therein a plurality of spaced embossed mold pockets projecting from the surface of said sheet and each containing a butter patty, comprising positioning said sheet with said embossed pockets uppermost, stretching said sheet until said surface becomes relatively rigid and inflexible, and pushing downwardly on said pockets to expel said patties.

2. The method of claim 1 in which said sheet is perimetrically clamped to achieve said stretching.

References Cited by the Examiner

UNITED STATES PATENTS

| | | | |
|---|---|---|---|
| 2,641,912 | 6/1953 | Lawler | 220—23.8 |
| 2,657,998 | 11/1953 | Peters | 99—171 |
| 2,688,557 | 9/1954 | Peters | 99—171 |
| 2,709,904 | 6/1955 | Boughton | 220—23.8 |
| 2,713,544 | 7/1955 | Peters | 99—171 |
| 2,745,752 | 5/1956 | Peters | 99—171 |
| 2,955,044 | 10/1960 | Tupper | 99—192 X |
| 2,957,604 | 10/1960 | Goldman et al. | 221—88 |

RAYMOND N. JONES *Acting Primary Examiner.*

A. LOUIS MONACELL, *Examiner.*

R. N. JONES, *Assistant Examiner.*